US010900586B2

(12) United States Patent
McDoneld et al.

(10) Patent No.: US 10,900,586 B2
(45) Date of Patent: Jan. 26, 2021

(54) SELF SEALING JETTING VALVE

(71) Applicant: ZENTECH, INC., Houston, TX (US)

(72) Inventors: Kevin Alan McDoneld, Richmond, TX (US); William David Reynolds, Jr., Katy, TX (US); Ramesh Maini, Houston, TX (US)

(73) Assignee: Zentech, Inc., Houston, TX (US)

( * ) Notice: Subject to any disclaimer, the term of this patent is extended or adjusted under 35 U.S.C. 154(b) by 54 days.

(21) Appl. No.: 16/200,331

(22) Filed: Nov. 26, 2018

(65) Prior Publication Data

US 2019/0162327 A1   May 30, 2019

Related U.S. Application Data

(60) Provisional application No. 62/590,732, filed on Nov. 27, 2017.

(51) Int. Cl.

| | |
|---|---|
| *F16K 31/122* | (2006.01) |
| *E02B 17/02* | (2006.01) |
| *E21B 7/124* | (2006.01) |
| *F16K 1/38* | (2006.01) |
| *F16K 15/02* | (2006.01) |
| *F16K 31/04* | (2006.01) |
| *F16K 41/04* | (2006.01) |
| *E02B 17/00* | (2006.01) |

(52) U.S. Cl.
CPC ........ *F16K 31/1221* (2013.01); *E02B 17/021* (2013.01); *E21B 7/124* (2013.01); *F16K 1/38* (2013.01); *F16K 15/026* (2013.01); *F16K 31/04* (2013.01); *F16K 41/04* (2013.01); *E02B 2017/0082* (2013.01)

(58) Field of Classification Search
CPC ...... F16K 1/38; F16K 15/026; F16K 31/1221; F16K 31/04; F16K 41/04; E02B 17/021; E02B 7/124; E02B 2017/0082
USPC .................................................. 137/535, 541
See application file for complete search history.

(56) References Cited

U.S. PATENT DOCUMENTS

| | | | |
|---|---|---|---|
| 4,162,763 A | 7/1979 | Higgins | |
| 5,799,688 A | 9/1998 | Yie | |
| 8,221,100 B2 | 7/2012 | Forrest et al. | |
| 2017/0307093 A1* | 10/2017 | Yo | F16K 15/186 |

FOREIGN PATENT DOCUMENTS

| | | |
|---|---|---|
| CN | 102535470 A | 7/2012 |
| CN | 103953046 A | 7/2014 |

OTHER PUBLICATIONS

International Search Report and Written Opinion in related application PCT/US18/62483 dated Feb. 25, 2019.

* cited by examiner

*Primary Examiner* — P. Macade Nichols
(74) *Attorney, Agent, or Firm* — Patterson + Sheridan, LLP (57) ABSTRACT

An apparatus for use in marine platform jacking is disclosed herein. In one aspect, a jetting valve includes a valve body with a piston assembly disposed therein. The piston assembly is selectively operated to open and close the valve. A biasing member is coupled to the piston assembly. The piston assembly includes a first piston and a second piston. The dual pistons, in cooperation with the biasing member, allow the valve to self-seal thereby preventing entry of a fluid which is external to the valve.

20 Claims, 6 Drawing Sheets

SELF SEALING JETTING VALVE

CROSS-REFERENCE TO RELATED APPLICATIONS

This application claims benefit of U.S. provisional patent application Ser. No. 62/590,732, filed Nov. 27, 2017, which is herein incorporated by reference.

BACKGROUND

Field

Embodiments of the present disclosure generally relate to jack up units for exploratory drilling. More specifically, the disclosure relates to components of jack up legs for marine platforms.

Description of the Related Art

A jack up unit is a self-elevating type of mobile platform wherein a purpose-built hull is outfitted with movable legs. The movement of the legs is referred to as "jacking". The legs are deployed to raise and lower from the hull to contact the seabed while the hull floats on the surface. Upon contacting the seabed, the legs provide a solid base for the hull. The movement of the legs raises the hull above the surface. The hull is positioned above the water at a planned elevation to allow stable operations during drilling by eliminating the sea motions from impacting the underside of the hull. In order to later move the platform, the legs are retracted thereby lowering the hull back to the surface while the legs are raised of the legs from the seabed.

The bottom of the leg structures are coupled to enlarged footings called spud cans. The spud cans may rest on the top of the seabed or penetrate into the seabed depending on the soil condition. Sometimes, the spud cans penetrate significantly into the seabed. For some soil formations, penetration of the spud cans into the seabed is essential in order to provide an adequate support for platform jacking and stability. Such penetration causes significant issues for the spud cans when the spud cans are deployed for an extended length of time.

The spud cans are commonly difficult to remove, or pull out of, the seabed due to the penetration. Sediment adheres to the spud can which increases the force needed to retract the leg. In order to remove this sediment and the attractive force created thereby, a jetting system is often utilized. However, the jetting system piping often becomes filled with soil from the seabed when the spud can is deployed on or into the seabed. After an extended time, typically ranging from a month to a half year and longer while drilling operations occur, the soil lodged within the jetting system piping may solidify rendering the jetting system useless. Further, as the leg is retracted, an air pocket is formed between the spud can the seabed. These air pockets create a vacuum force on the spud can thereby significantly increasing the force needed to retract the leg. Therefore, a need exists for an improved jetting system.

SUMMARY

The present disclosure generally relates to jack up units for exploratory drilling. More specifically, the disclosure relates to components of jack up legs for marine platforms.

In one aspect, a jetting valve comprises a valve body and a piston assembly disposed within the body. The piston assembly comprises a first piston, a second piston, and a shaft coupled to the first piston and the second piston. The jetting valve further comprises an insert coupled to the valve body. A portion of the shaft is disposed through the insert. The insert and the first piston create a first volume and a second volume within the valve body.

In another aspect, a valve cartridge comprises an end piece with a port therein. A housing is coupled to the end piece. A first piston is disposed in the port. A second piston is disposed adjacent the housing. A shaft is coupled to the first piston and the second piston.

In yet another aspect, a jetting valve system comprises a pressure source and a valve coupled to the pressure source. The valve comprises a body having a first end and a second end. The first end is in fluid communication with the pressure source. An insert is disposed within the body. A shaft is disposed in the body through the insert. A first piston is disposed adjacent the insert while a second piston disposed in a port in the second end of the valve body. The first piston and the second piston are further coupled to the shaft.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure is a device for use in marine platform jacking. In one aspect, a jetting valve includes a valve body with a piston assembly disposed therein. The piston assembly is selectively operated to open and close the valve. A biasing member is coupled to the piston assembly. The piston assembly includes a first piston and a second piston. The dual pistons, in cooperation with the biasing member, allow the valve to self-seal thereby preventing entry of a fluid external to the valve.

Figure 1A:
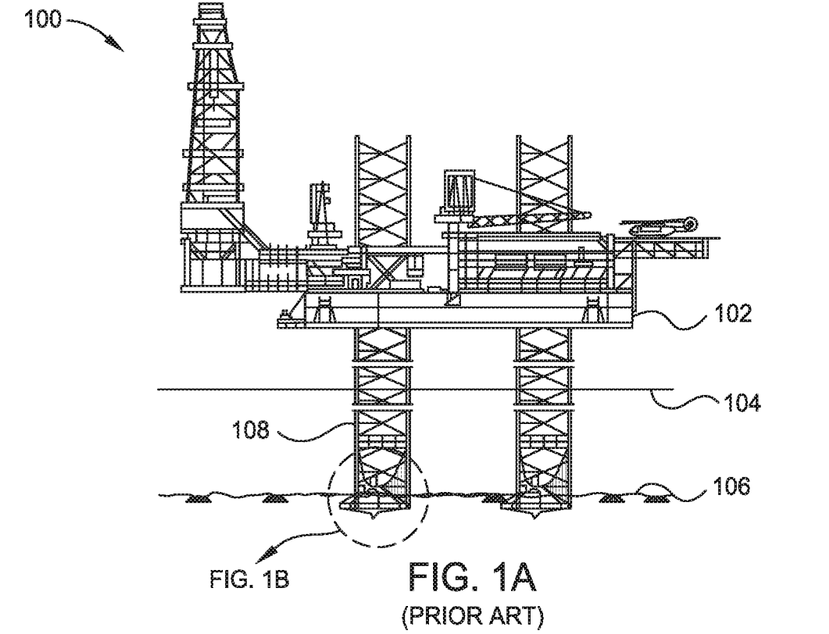
FIG. 1A is an illustrative representation of a jack up unit.

FIG. 1A is a schematic representation of a jack up unit 100. The jack up unit 100 includes a hull 102 and legs 108.

Figure 1B:
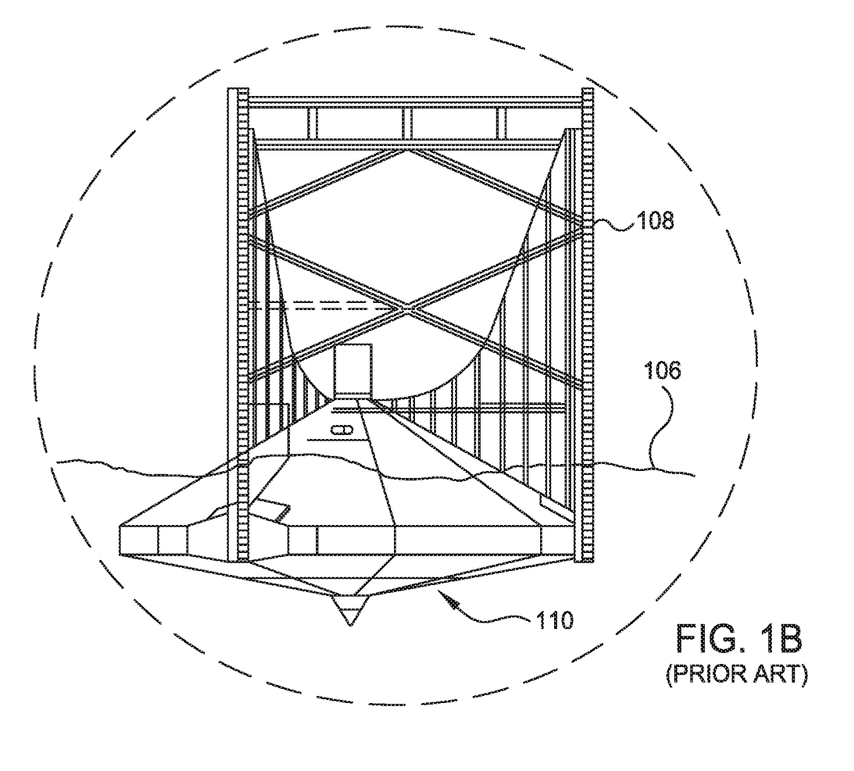
FIG. 1B is an illustrative representation of a conventional spud can.

In FIG. 1A, the legs 108 are shown deployed so that the hull 102 is raised above the sea surface 104. A portion of the legs 108 is in contact with the seabed 106 is shown in FIG. 1B, which is an enlargement of a portion of a leg 108. A lower portion of the leg 108 includes an enlarged footing portion, such as a spud can 110. The spud can 110 is shown penetrating into the seabed 106.

Figure 2A:
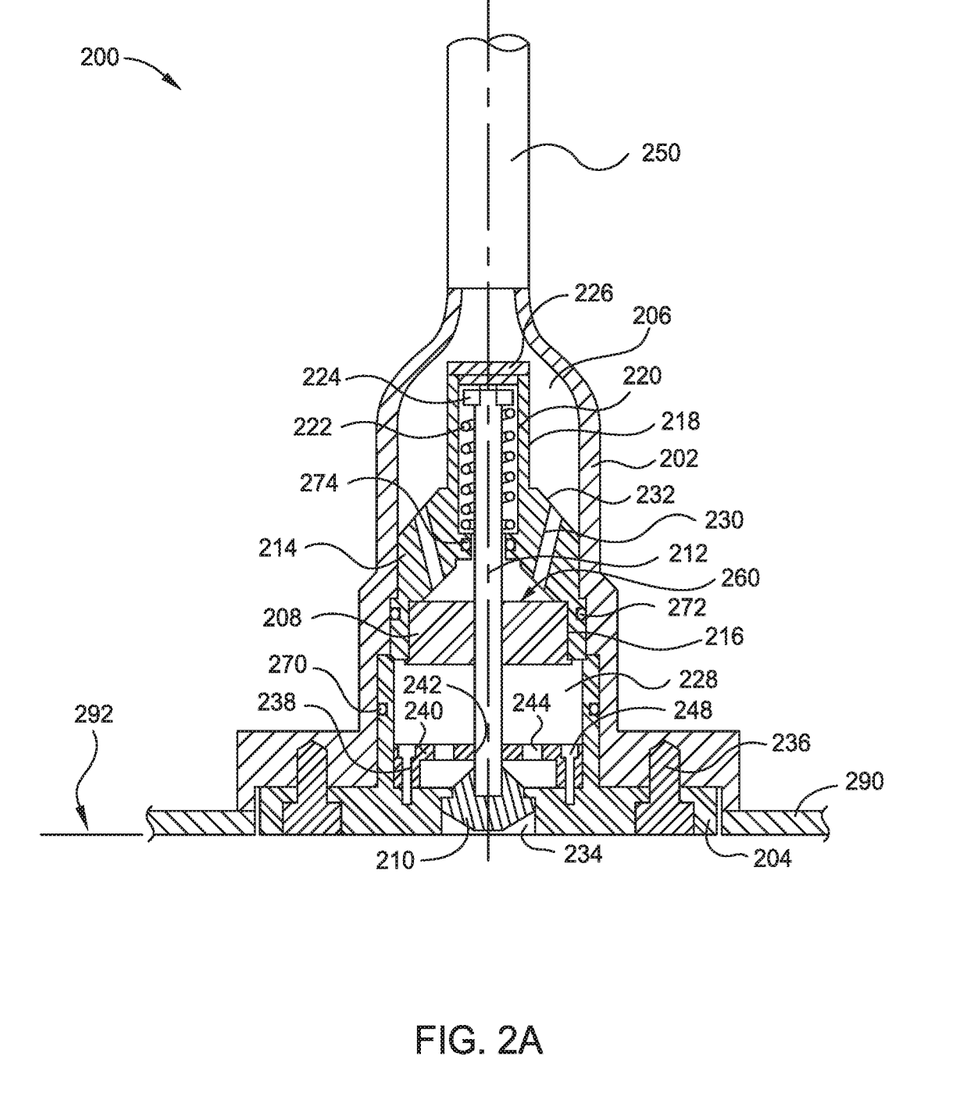
FIG. 2A is a schematic arrangement, in cross section, of a jetting valve according to one embodiment.

FIG. 2A is a cross-sectional schematic view of a jetting valve 200 for use with a spud can accord one embodiment. The jetting valve 200 includes a housing 202 coupled to a cap 204. In the embodiment of FIG. 2A, the housing 202 has a bell shape. However, any shape suitable for operation of jetting valve 200 may be used. In certain embodiments, the housing 202 is formed from a metallic material such as steel, stainless steel, or similar alloys. In further embodiments, the housing 202 may be formed from a polymer or carbon fiber.

An upper piston 208 and a lower piston 210 are coupled to a shaft 212 and are disposed within the housing 202. The upper piston 208, the lower piston 210, and the shaft 212 form a piston assembly. A spring housing 214 encloses an upper portion of the shaft 212. The upper piston 208 is disposed within a recess 216 in the spring housing 214. The recess 216 is configured to seat the upper piston 208 to form a seal therebetween. The spring housing 214 further includes a cylindrical portion 218 having a recess 220 therein. The cylindrical portion 218 extends from an upper surface 232 of the spring housing 214. A spring 222 is disposed within the recess 220 and is coupled to the shaft 212 by a spring stop 224. The recess 220 is enclosed by a spring cap 226 coupled to an end thereof. The spring cap 226 contains the shaft 212, and spring stop 224 coupled thereto, within the recess 220.

The spring housing 214 is coupled to the housing 202 to define an upper volume 206 and a lower volume 228. The lower volume 228 is in fluid communication with the upper volume 206 by flow apertures 230 through the spring housing 214. The flow apertures 230 extend from the upper surface 232 of the spring housing 214 to the recess 216. The upper piston 208 selectively allows fluid communication between the lower volume 228 and the upper volume 206 through the recess 216 and flow apertures 230. A seal 272 is optionally disposed between the spring housing 214 and the housing 202 to prevent passage of a fluid, such as sea water, therebetween. Similarly, a seal 274 is also optionally disposed between the spring housing 214 and the shaft 212. The seals 272, 274 may be one or more of O-rings, bushings, metallic rings, or any other device suitable for preventing leak between the bodies. Further, more than one seal, such as two seals, may be used. The design and number of seals 272, 274 are selected in relation to the operating conditions of the jetting valve 200. In one embodiment, the seal 272 is an O-ring within a groove in the spring housing 214.

In certain embodiments, the spring housing 214 is a unitary body and the flow apertures 230 are passageways formed therethrough. In other embodiments, the flow apertures 230 are gaps between supporting members which couple the cylindrical portion 218 to a portion of the spring housing 214 disposed adjacent to the housing 202 (for example, as shown in the embodiment of FIG. 2C). Further, the shape of the spring housing 214 is not limited to the shown configuration. For example, the spring housing 214 may be disc shaped or a substantially cylindrical shaped.

The cap 204 generally includes a discus body having a central port 234 therethrough. The lower piston 210 is disposed within the port 234. The lower piston 210 is seated within the port 234 to form a seal therebetween. The lower piston 210 selectively allows fluid communication between the port 234 and the lower volume 228. The lower piston 210 is further coupled to the shaft 212 at an end opposite of the spring 222. In such an embodiment, the cap 204 is coupled to housing 202 by fasteners 236. The fasteners 236 are, for example, screws or bolts. Other means of coupling the cap 204 to the housing 202 such as welding or threaded joints are contemplated. A seal 270 is optionally disposed between the housing 202 and the cap 204 to prevent bypass of a fluid therebetween. The seal 270 may be one or more of O-rings, bushings, metallic rings, or any device suitable for preventing leak between the bodies. Further, more than one seal, such as two seals, may be used. The design and number of seals used for seal 270 is selected in relation to the operating conditions of the jetting valve 200. In one embodiment, the seal 270 includes an O-ring disposed within a groove in the cap 204. The cap 204 and the housing 202 are coupled to a spud can 290. In some embodiments, the housing 202 is disposed within the spud can 290.

The port 234 is not limited to the shown configuration. For example, an array of flow apertures may be utilized for the port 234. Further, the shape of the lower piston 210 may be optimized to match the shape of port 234. Still further, a plurality of lower pistons 210 may also be used.

A shaft guide 238 is disposed between the cap 210 and the spring housing 214. The shaft guide includes a body 240 with a central aperture 242 through which the shaft 212 passes. The shaft guide 238 functions to guide the shaft 212 as the shaft 212 is actuated. In certain embodiments, the shaft 212 has a large unsupported length. The shaft guide 238 provides a support surface to minimize or prevent bending or flexing of the shaft 238. An array of flow apertures 244 is disposed through the body 240. The flow apertures 244 allow fluid communication between the lower volume 228 and the port 234. In this embodiment, the shaft guide 238 is coupled to the cap 202 by fasteners 248. The fasteners may be, for example, threaded fasteners. Other means of coupling the shaft guide 238 to the cap 202, such as welding, are contemplated.

A jetting system 250 is coupled to the jetting valve 200 at an upper end of the housing 202. The jetting system 250 includes, for example, piping and a pump (not shown) to provide a pressurized fluid to the jetting valve 200. In one embodiment, the jetting system supplies sea water to the jetting valve 200. The fluid may be pressurized in a range, for example, from 600 psi to 1600 psi. The pressure of the fluid is selected in relation to the surface area of the jetting valve 200, the depth of the spud can 110, or the soil in which the spud can 110 is disposed.

Figure 3:
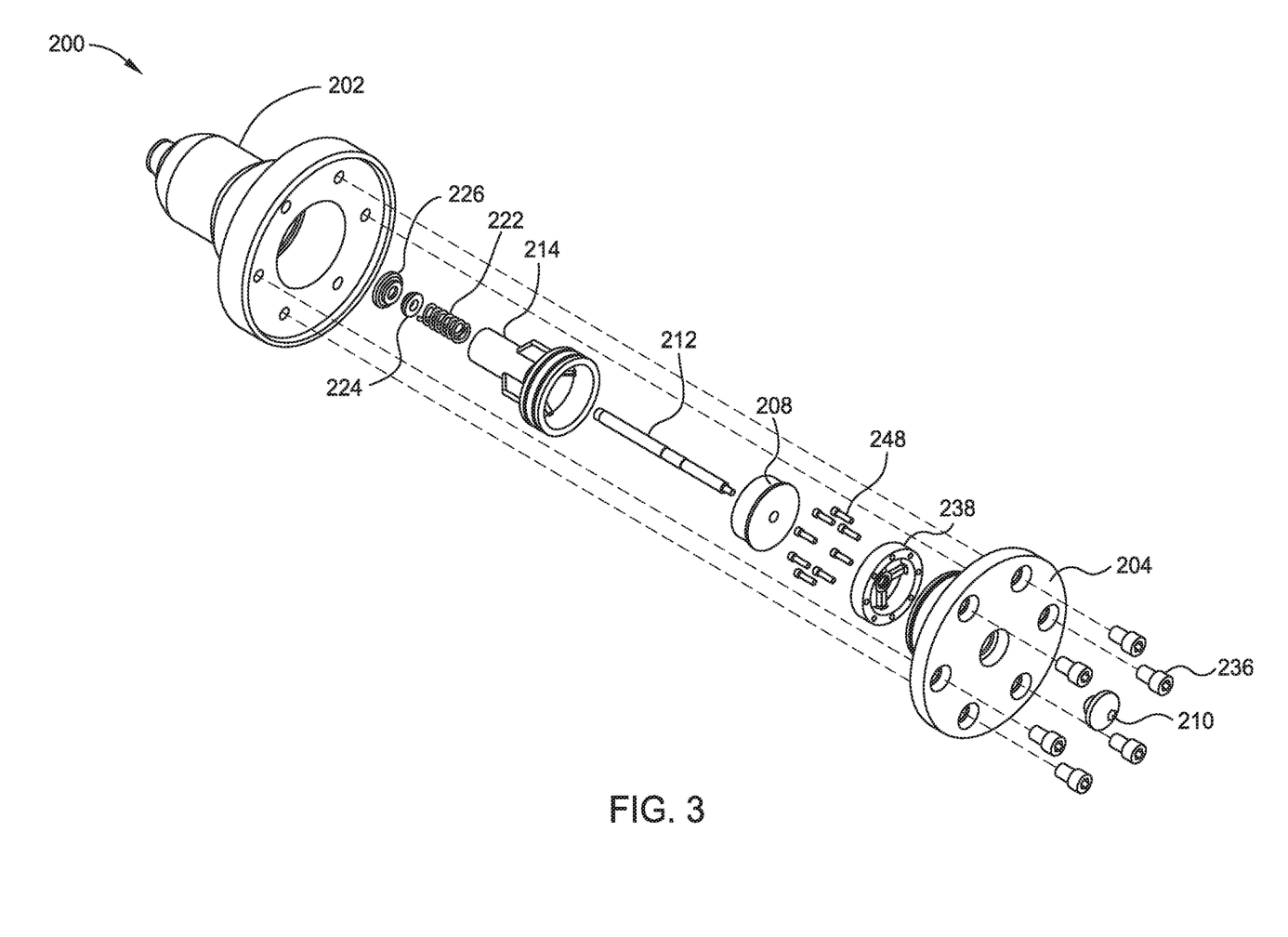
FIG. 3 is a schematic isometric, exploded view of a jetting valve according to one embodiment.

FIG. 3 is an exploded isometric view of a jetting valve 200. FIG. 3 indicates the relationship of the components of the jetting valve 200 and the order of assembly thereof.

During operation, the jetting system 250 supplies a pressurized fluid into the housing 202 of the jetting valve 200. The pressurized fluid enacts a pressure onto an upper surface 260 of the upper piston 208 through the flow apertures 230. As the pressure of the pressurized fluid increases, a pressure differential is created across the upper piston 208 between the upper volume 206 and the lower volume 228. The pressure differential enacts a force on to the upper piston 208 which biases the upper piston 208 towards the lower volume 228, herein representatively downward.

The spring 222 enacts a spring force onto the spring cap 224 coupled to the shaft 212. That is, since the spring 222 is retained by the recess 220 and the spring stop 224, a spring force is enacted onto the spring stop 224 which is translated to the shaft 212. The spring force biases the shaft 212, the upper piston 208, and lower piston 210 towards the upper volume 206. The pressure differential across the upper piston 208 is selected to be large enough to overcome the spring force enacted by the spring 222 in order to move the piston assembly.

Returning to FIG. 2A, FIG. 2A illustrates the jetting valve in an arrangement referred to herein as the closed position. In the closed position, the upper piston 208 fully contacts the recess 216 to isolate the lower volume 228 from the upper volume 206. Similarly, the lower piston 210 is fully seated within the port 234 to isolate the port 234 from the lower volume 228. Pressure within the upper volume 206 is increased by the jetting system 250 thereby increasing the pressure differential across the upper piston 208. Once the pressure differential is great enough to overcome the spring force of the spring 222, the upper piston 208, the shaft 212, and the lower piston 210 are biased downward, away from the upper volume 206 to an open position as shown in FIG. 2B.

Figure 2B:
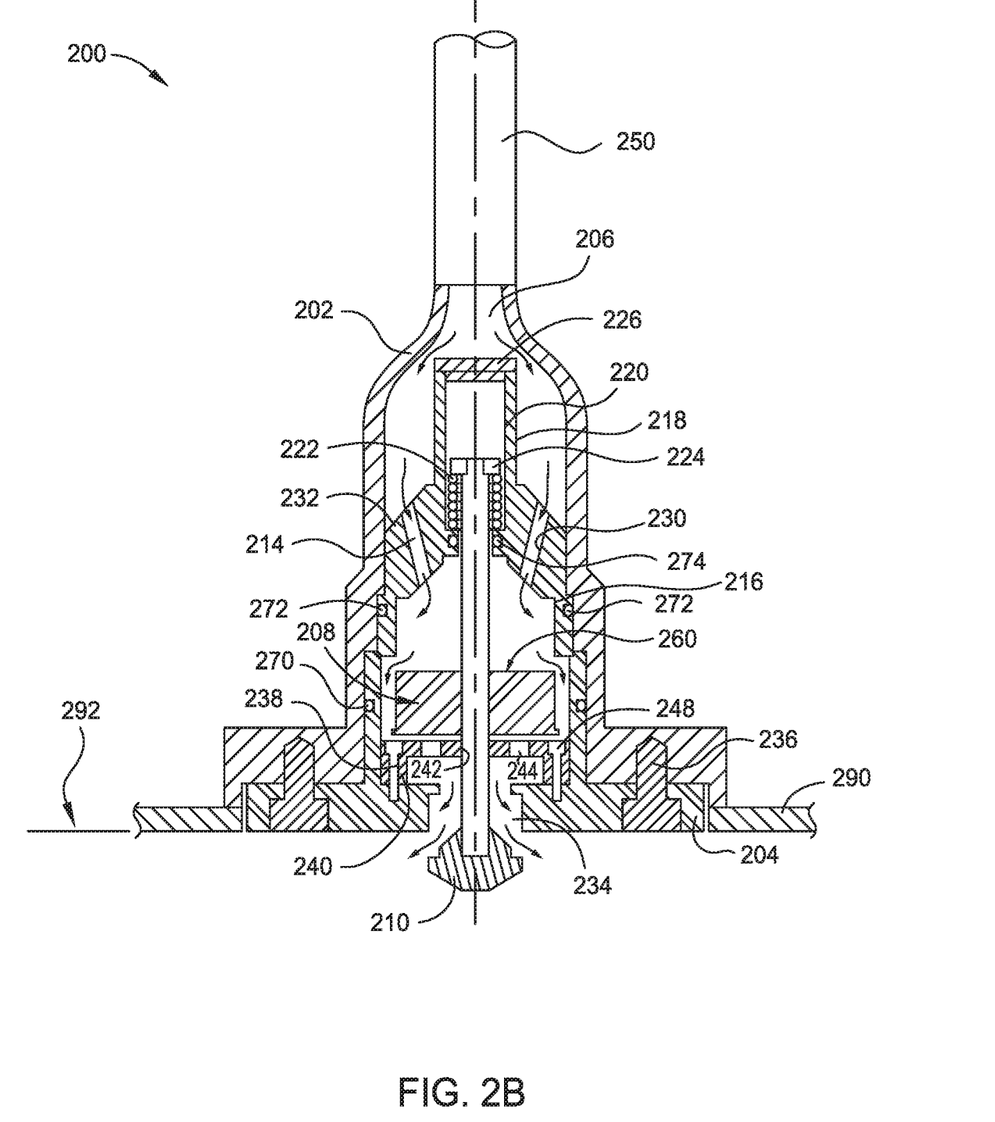
FIG. 2B is a schematic arrangement, in cross section, of a jetting valve according to one embodiment.
Figure 2C:
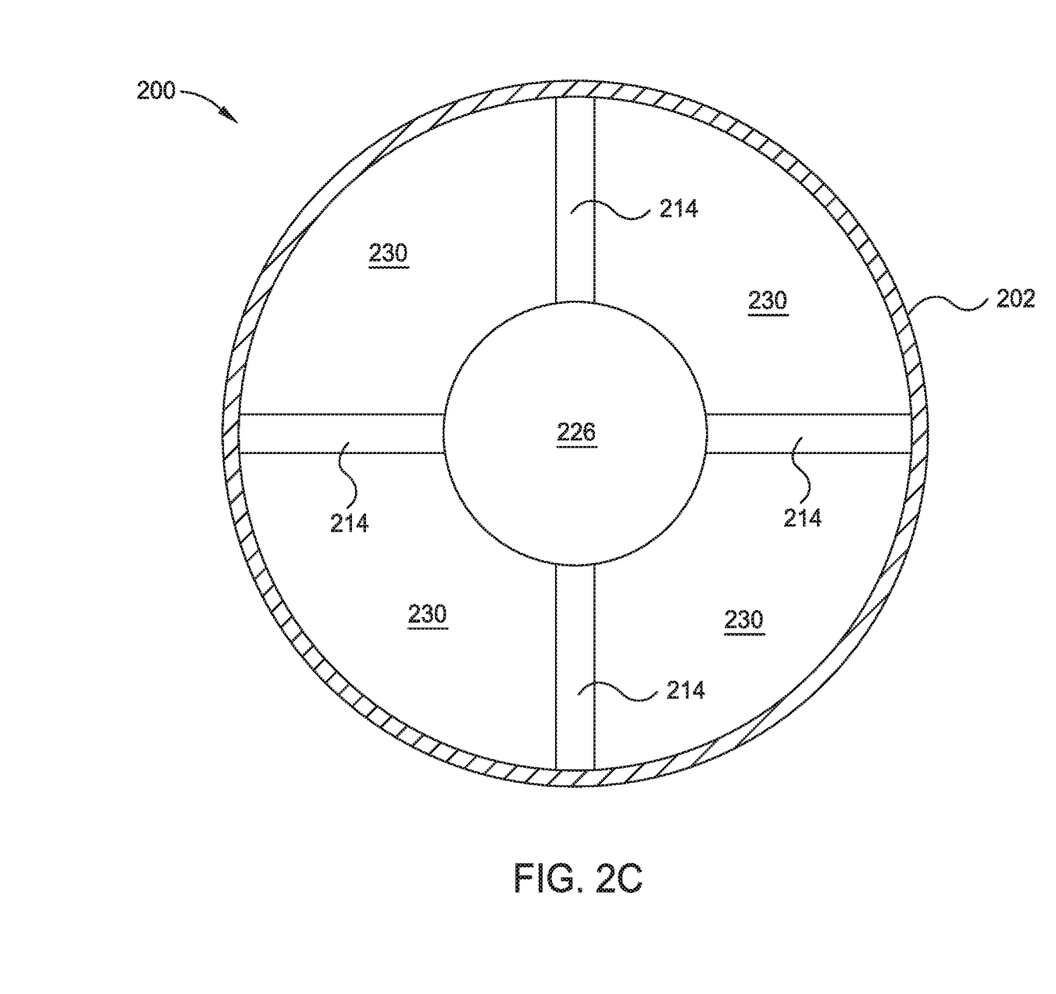
FIG. 2C is a schematic arrangement, top down plan view, of a jetting valve according to one embodiment.

In FIG. 2B, which represents the open position of the jetting valve 200, the lower piston 210 is disposed away from the port 234. Similarly, the upper piston 208 is disposed away from the recess 216. Therefore, an open path is created between the upper volume 206, the lower volume 228, and the port 234. Accordingly, the pressurized fluid supplied by the jetting system 250 flows from the upper volume 206, through the flow apertures 230 into the recess 216. From the recess 216, the fluid flows into the lower volume 228, through the flow apertures 244 in the shaft guide 238, and through the port 234.

The flow of the pressurized fluid is sufficient to dislodge sediment, such as compacted soil from the seabed 292, from an external surface of a spud can, such as spud can 290. Additionally, the pressure supplied by the jetting system 250 is sufficient to overcome the spring force of the spring 222 and a hydrostatic pressure enacted onto the jetting valve 200 by the seawater. Further, the pressurized fluid supplied by the jetting system 250 fills an air gap created by retraction of the leg coupled to the spud can 290. Since the air gap is sufficiently filled with a high pressure fluid, a vacuum does not form in the air gap thereby reducing the attractive force between the spud can 290 and the seabed 292. Therefore, the force needed to retract the leg is reduced.

After the sediment has been sufficiently cleared by the jetting system 250 or the leg has been retracted, the pressure is reduced in the jetting valve 200. This may be accomplished by lowering the pressure supplied by the jetting system 250 or by stopping flow of the pressurized fluid. Once the pressure has been relieved, the spring force supplied by the spring 222 biases the shaft 212, the upper piston 208, and the lower piston 210 towards the upper volume 206. Therefore, the upper piston 208 reengages the recess 216 and the lower piston 210 reengages the port 234. That is, after the pressure is reduced, the jetting valve 200 returns to the closed position as illustrated in FIG. 2A. The force created by the spring 222 allows the valve to self-seal thereby preventing sediment from entering the volumes 206, 228. The self-sealing ability as described herein minimizes degradation of the internal components of the jetting valve 200 due to exposure to the sediment material. Therefore, the jetting valve according to the disclosure may be deployed within the seabed for an extended length of time without impacting the operability thereof.

The jetting valve 200 may be optimized for the specific soil type and platform design. For example, the shape of the housing 202, flow apertures 230, upper piston 208, lower piston 210, and port 234 may be selected to create a desire flow profile of the pressurized fluid from jetting system 250. Additionally, the upper piston 208 and lower piston 210 may be a single, unitary piston. Still further, the jetting valve 200 may be located for easy access and maintenance thereof. In one embodiment, the jetting valve 200 is disposed within a spud can. In another embodiment, the jetting valve is disposed upstream of the spud can.

Additionally, the jetting valve 200 may be operated by other means. For example, a hydraulic or pneumatic system may be coupled to the shaft 212 in order to operate the jetting valve 200. Similarly, an electric means, such as a linear actuator, may be utilized to operate the jetting valve 200.

Figure 4A:
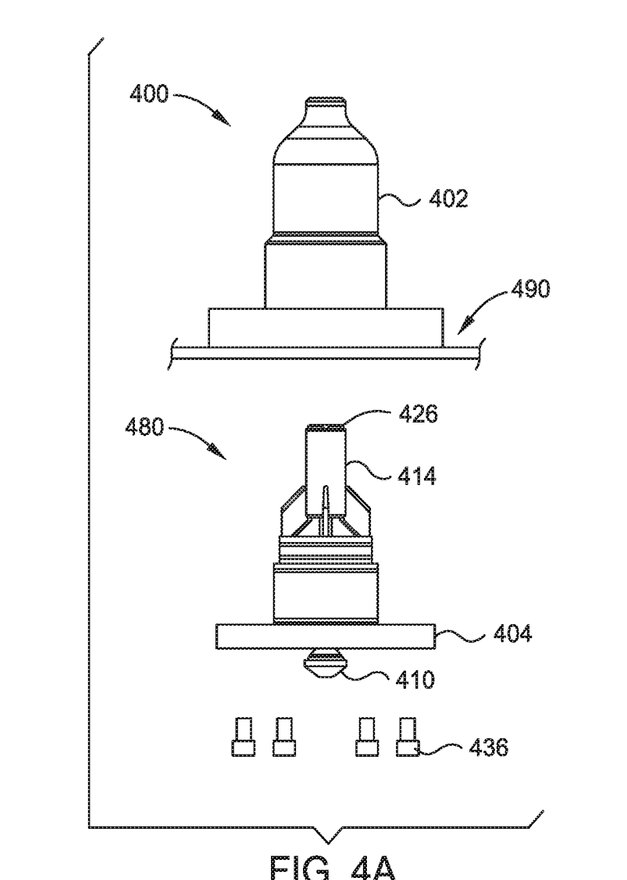
FIG. 4A is a schematic arrangement of a valve cartridge according to one embodiment.
Figure 4B:
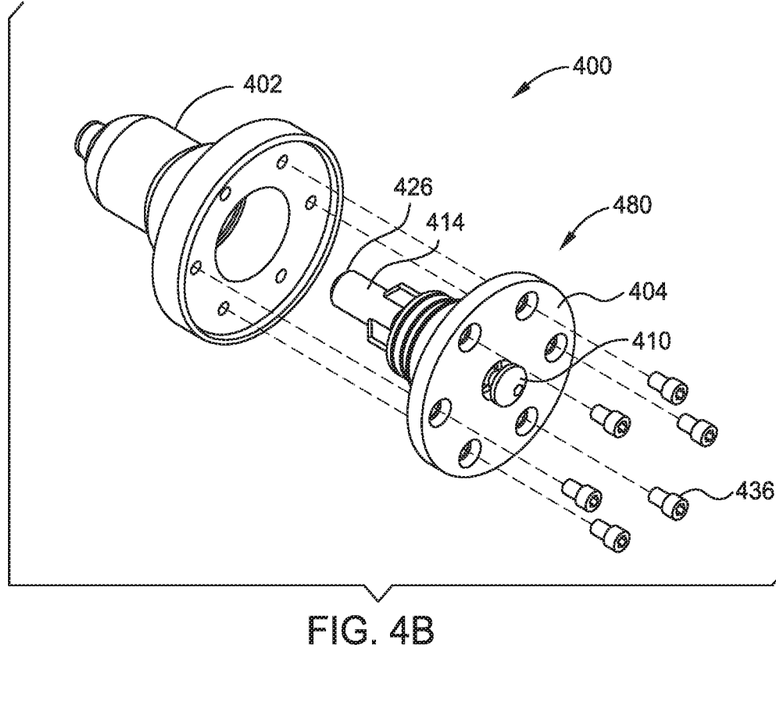
FIG. 4B is a schematic isometric, exploded view of a valve cartridge according to one embodiment.

In order to facilitate ease of maintenance of the jetting valve, the jetting valve includes an easily swappable valve cartridge. FIG. 4A is a schematic view of a valve cartridge 480 of a jetting valve 400 according to certain embodiments. FIG. 4B is a schematic exploded perspective view of the valve cartridge 480 of FIG. 4A. In FIGS. 4A and 4B, a jetting valve 400 includes a housing 402 and a valve cartridge 480. The jetting valve 400 may be used in place of the jetting valve 200, and may include one or more components of the jetting valve 200 of FIGS. 2A and 2B. Here, the valve cartridge 480 includes a cap 404, a lower piston 410, a spring housing 414, and a spring cap 426. Other components that form the valve cartridge 480, which are not shown for clarity, include the upper piston 208, the shaft 212, the shaft guide 238, the spring 222, and the spring stop 224 of FIG. 2A and FIG. 2B. The valve cartridge 480 is coupled to the housing 402 by a plurality of fastener 436. The jetting valve 400 is coupled to spud can 490. In some embodiments, the housing 402 is disposed within the spud can 490.

The valve cartridge 480 allows for rapid removal, or replacement thereof, by removing the fasteners 436. In certain applications, the jetting valve 400 requires maintenance to be performed by a diver. By utilizing the valve cartridge 480, the valve cartridge 480 may be easily replaced with an identical valve cartridge by a diver. Maintenance of the valve cartridge 480, such a replacement of wear components or seals, may be done above the surface on a vessel or on land. Therefore, the time required for maintenance of the jetting valve 400 is greatly reduced. Further, the risks associated with maintenance of the jetting valve 400 for a diver are greatly reduced.

While the foregoing is directed to embodiments of the present disclosure, other and further embodiments of the disclosure may be devised without departing from the basic scope thereof, and the scope thereof is determined by the claims that follow.

What is claimed is:

1. A jetting valve, comprising:
 a valve body;
 a piston assembly disposed within the body, the piston assembly comprising:
  a first piston;
  a second piston; and
  a shaft coupled to the first piston and the second piston; and
 an insert coupled to the valve body having a portion of the shaft therethrough, wherein the insert and the first piston define a first volume and a second volume within the valve body, and wherein the insert comprises a plurality of flow apertures therethrough, the first volume and the second volume in fluid communication through the flow apertures.

2. The jetting valve of claim 1, further comprising a spring coupled to the shaft and the insert.

3. The jetting valve of claim 1, further comprising:
a cap; and
a port disposed within the cap, wherein the second piston is disposed within the port, the second piston selectively allowing fluid communication between the second volume and the port.

4. The jetting valve of claim 1, wherein the first piston selectively allows access to, and blocks access to, the plurality of flow apertures.

5. The jetting valve of claim 3, wherein a seal is disposed between the valve body and the cap.

6. The jetting valve of claim 3, further comprising a shaft guide disposed between the cap and the insert.

7. A valve cartridge, comprising:
an end piece having a port therethrough;
a housing member coupled to the end piece, wherein the housing member further comprises flow apertures disposed between a first surface and a second surface of the housing member;
a first piston disposed in the port;
a second piston disposed adjacent the housing member, wherein the second piston selectively allows access to, and blocks access to, the flow apertures; and
a shaft coupled to the first piston and the second piston.

8. The valve cartridge of claim 7, further comprising a biasing member coupled to the shaft.

9. The valve cartridge of claim 8, wherein the biasing member comprises a spring.

10. The valve cartridge of claim 7, further comprising a shaft guide disposed around the shaft.

11. A jetting valve system, comprising:
a pressure source; and
a valve coupled to the pressure source, the valve comprising:
a body having a first end and a second end, the first end in fluid communication with the pressure source;
an insert disposed within the body, wherein the insert comprises flow apertures disposed between a first surface and a second surface of the insert;
a shaft disposed in the body through the insert;
a first piston disposed adjacent the insert; and
a second piston disposed in a port in the second end of the body,
wherein the first piston and the second piston are coupled to the shaft.

12. The jetting valve system of claim 11, wherein the second end of the body comprises a cap.

13. The jetting valve system of claim 11, further comprising a biasing member coupled to the shaft.

14. The jetting valve system of claim 11, wherein the first piston is selectively disposed against the second surface to allow access to, and block access to, the flow apertures.

15. The jetting valve system of claim 11, further comprising a shaft guide disposed adjacent to the shaft.

16. The jetting valve system of claim 11, wherein the pressure source provides a pressurized fluid to selectively operate the valve.

17. A jetting valve, comprising:
a valve body;
a piston assembly disposed within the body, the piston assembly comprising:
a first piston;
a second piston; and
a shaft coupled to the first piston and the second piston;
an insert coupled to the valve body having a portion of the shaft therethrough, wherein the insert and the first piston define a first volume and a second volume within the valve body;
a cap; and
a port disposed within the cap, wherein the second piston is disposed within the port, the second piston selectively allowing fluid communication between the second volume and the port.

18. The jetting valve of claim 17, wherein a seal is disposed between the valve body and the cap.

19. The jetting valve of claim 17, further comprising a shaft guide disposed between the cap and the insert.

20. A jetting valve system, comprising:
a pressure source; and
a valve coupled to the pressure source, the valve comprising:
a body having a first end and a second end, the first end in fluid communication with the pressure source, and wherein the second end of the body comprises a cap;
an insert disposed within the body;
a shaft disposed in the body through the insert;
a first piston disposed adjacent the insert; and
a second piston disposed in a port in the second end of the body, wherein the first piston and the second piston are coupled to the shaft.

* * * * *